Nov. 14, 1972  V. D. BOWMAN  3,702,756

SMOKELESS ANTITOXIC BURNER APPARATUS

Original Filed March 11, 1970  3 Sheets-Sheet 1

INVENTOR
VERNON D. BOWMAN
ATTORNEY
AGENT

INVENTOR
VERNON D. BOWMAN

United States Patent Office 3,702,756
Patented Nov. 14, 1972

3,702,756
SMOKELESS ANTITOXIC BURNER APPARATUS
Vernon D. Bowman, 5625 Coach and Four Drive E.,
Apt. I, Kettering, Ohio 45440
Continuation of application Ser. No. 18,551, Mar. 11, 1970. This application Jan. 6, 1971, Ser. No. 104,487
Int. Cl. B01d 47/06
U.S. Cl. 23—277 C
9 Claims

ABSTRACT OF THE DISCLOSURE

An apparatus for burning and scrubbing exhaust gases, smoke and similar waste products and solid particles carried thereby and preventing their discharge into the atmosphere. The apparatus consists of one or more burner chambers through which the gases to be purified are forcibly conducted and the combustible products consumed, a second chamber having tortuous passage wherein the gases are forced and therein subjected to steam and water sprays to remove solids and soluble constituents and an exhaust to the atmosphere for the purified gases.

---

This application is a continuation of my earlier filed application for "Smokeless Anti-Toxic Burner Apparatus" Ser. No. 18,551 filed Mar. 11, 1970, now abandoned.

This invention relates to devices for burning and otherwise purifying the exhaust gases which are normally sent through smokestacks into the atmosphere to eliminate therefrom those constituents which are harmful to human health and which pollute the atmosphere and are the major cause of smoke and like objectionable conditions.

It is one object therefore to produce a device of the character mentioned which will not only efficiently and completely burn all combustible gaseous ingredients but will effectively remove substantially all the solid particles such as fly ash, dust and the like that are frequently found in the exhaust stream from various industrial processes which, if passed directly into the atmosphere, are injurious to human health.

Another object is to produce a device of this character which will function effectively and economically and one which requires little attention.

The above and other objects and advantages have been realized by applicant's provision of apparatus for subjecting the exhaust products to burner which consume the combustible constituents thereof and thereafter scrubbing the products with steam and water sprays for removing any solid and soluble particles therefrom and then only releasing the remaining harmless constituents into the atmosphere.

In the accompanying drawings, which form a part of this specification, like characters of reference refer to like parts in the several views.

Figure 1:
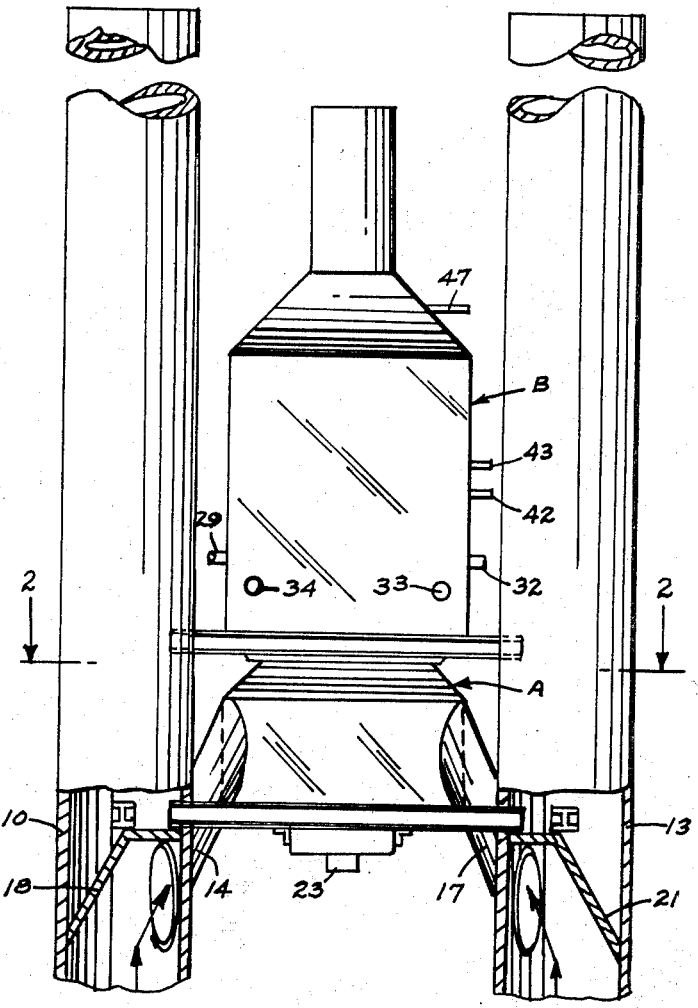
FIG. 1 is a side elevation of apparatus according to my invention installed in connection with a number of smokestacks.
Figure 2:
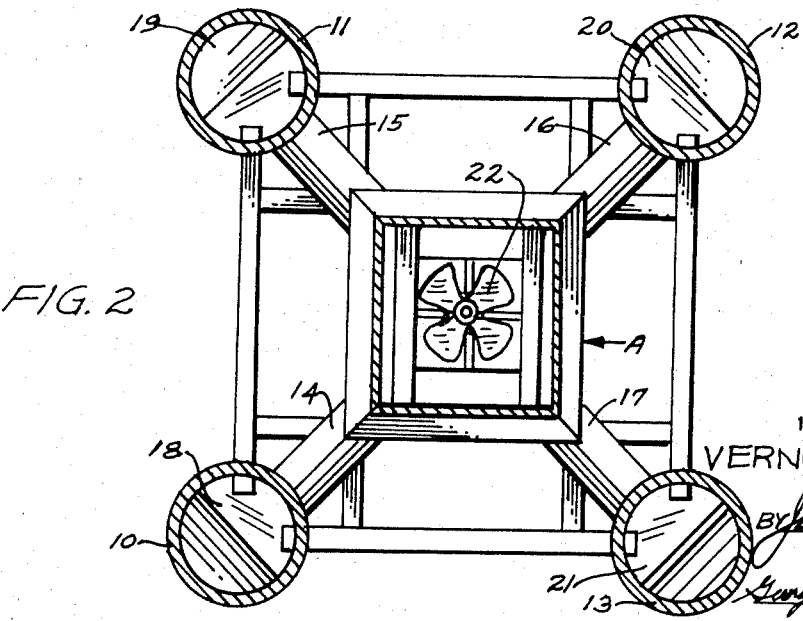
FIG. 2 is a sectional view thereof taken on line 2—2 of FIG. 1.

Referring more specifically to the drawings and for the present to FIGS. 1 and 2, the apparatus consists of two main portions, i.e. the portion generally designated A which is an accumulation chamber and the portion designated B which is the burner-scrubber section of the apparatus.

The accumulation chamber portion A receives the exhaust products to be purified, which may be the discharge of one or more smokestacks of an industrial plant, power generating station or any one of numerous factories which normally discharge smoke and like pollutants into the atmosphere. In the example illustrated in FIGS. 1 and 2 the four smoke stacks 10, 11, 12 and 13 are provided with branch ducts 14, 15, 16 and 17 respectively which conduct the waste gases, etc. from the stacks to the accumulation chamber A. Deflection plates 18, 19, 20 and 21 serve to close off the stacks above the branch ducts and divert the gases from the stacks through the branch ducts into the accumulation chamber. The deflection plates 18, 19, 20 and 21 may be made in the form of valve plates which may be opened to allow free passage of gases through the stacks without being diverted into the branch ducts, if desired.

At the top of the accumulation chamber A is mounted a fan 22 driven by a motor 23 for propelling the gases in and through the accumulation chamber A to the burner-scrubber section B, however, the means for creating the forced draft may be located at any convenient location.

In the embodiment described the accumulation chamber is shown receiving the gases from four smokestacks, but it is understood that the device may be made to accommodate any number of stacks desired.

Figure 3:
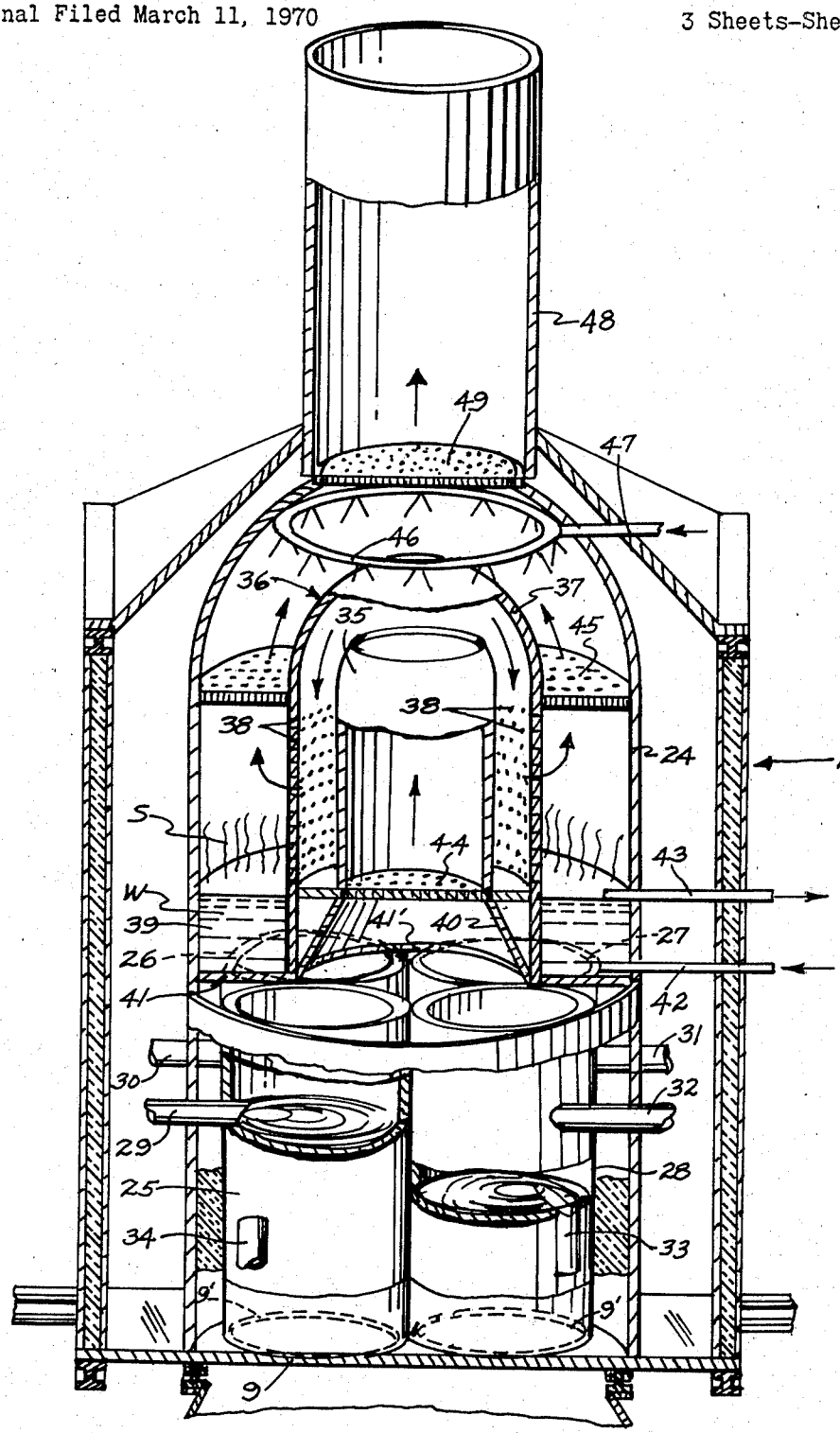
FIG. 3 is a longitudinal vertical section thereof.

Reference is now had to FIG. 3 which shows in greater detail the burner-scrubber section B of the device. This section is enclosed in a casing 24 and has in its lower region the burner portion which is made up of a number of burner chambers 25, 26, 27 and 28. These chambers are hollow and form ducts or passages for the gases to be treated as they are forced upwardly therethrough by the fan 22 in the accumulation chamber. The burner chambers have one or more burners 29, 30, 31, 32, 33 and 34 therein, which may be oil or gas fired and which for proper function should be of the high intensity type to insure complete combustion of all burnable constituents in the gases being treated. These burners are preferably located at an angle to the vertical axis of the respective chambers to create a whirling action within the chambers when the device is in operation, which is one way of setting up a turbulence in the exhaust gases passing through the burner chamber.

By creating a high turbulence within the burner chamber, all areas of the exhaust gases are uniformly exposed to the high predetermined temperatures within the chamber.

A flue-like pipe 35 is preferably located centrally within the casing 24 and above the burner chamber and in communication therewith. Also located within the casing upwardly from the end of the pipe 35 is a downwardly concaved deflector baffle 37 which is supported on the member 36. The deflector baffle is closed at its upper end to form a dome shaped top. The dome support is shown in the form of a skirt having perforations 38. The perforations may be of any size or shape and in some instances the perforated skirt may be dispensed with entirely depending upon the desired rate of movement of the gases through the scrubber area.

A water reservoir 39 is situated directly above the burner chamber and may be formed by the outer gas retaining wall 24 and an inner wall such as the lower portion of the skirt 36 and a bottom wall 41 which projects partly over the burner chambers as shown, so as to be heated thereby. If the member 36 is not used, a separate wall may be provided for the inner wall of the water reservoir.

Inlet and outlet pipes 42 and 43 respectively extend through the casing 24 and communicate with the water reservoir for supplying the latter with water and removing trapped matter from the gases, as will be described in more detail hereinafter. The flue-like pipe 35 receives the gases from the burner chamber or chambers through the opening 41' in the bottom wall 41 and through the tapered duct portions 40 communicating therewith.

A perforated baffle plate 44 may be located at the lower or entrance end of the flue-like pipe 35 for rejecting the larger particles fom the flue gases, and a second perforated baffle plate 45 may be positioned between the casing 24 and the dome 37 if desired. These baffle plates 44 and 45 may be dispensed with depending upon the contents of the gases being scrubbed.

Located within the casing 24 and above the dome 37 is a ring shaped sprayer 46. This sprayer is fed by a water feed line 47 extending through the casing and is designed to operate in a downward direction fine streams of water toward the rising combination of steam and moisture saturated exhaust gases.

The casing 24 is domed inwardly over the sprayer 46 and communicates with the exhaust stack 48. A third perforated baffle plate 49 may extend across the stack 48 adjacent its connection with the domed top of the casing 24.

As these perforated baffles mentioned herein may cause restrictions in the flow of the gases, one or more of these may be dispensed with depending upon the type of exhaust gases being scrubbed.

The operation of the embodiment above described is as follows:

The exhaust materials from the stacks 10–13 is conducted through ducts 14–17 into the accumulation chamber A where it is forced by the fan 22 into the burner chambers 25–28. There the material is subjected to high turbulence and intensive heat of the burners in these chambers whereby any combustible matter, gaseous or solid, will be mostly consumed. From the burner chambers the material will be forced upwardly through the flue-like pipe 35 and into the dome 37, thence downwardly in the space between pipe 35 and the casing 24 and outwardly over the water reservoir to be saturated with wet steam from the water 39 in preparation for the removing of such fine particles from the exhaust gases which have not been consumed as previously described. The water in reservoir 39 is heated to the boiling point to produce steam preferably by the heating means used for the burner chamber. The minute solid particles are saturated by the wet steam which captures these solid particles and other materials which may be carried by the exhaust gases. In addition, as the gases pass upwardly over the dome top 37 they are subjected to the fine water spray from the sprayer 46. The matter captured by the wet steam is cooled and formed into droplets by the water spray and falls by gravity to the water in the reservoir and is then carried off through the outlet pipe 43 leading from the water reservoir and the scrubbed gases are then passed out into the atmosphere through the exhaust stack 48.

In further explanation, the exhaust gases which have been preheated to a high temperature within the burner chamber are subjected to the bath of steam S within the area above the reservoir. These exhaust gases readily mix with the steam since both are in a gaseous state to form a mixture of exhaust gases and steam.

The water sprayer 46 is positioned in the area about the dome 37 and over the steam bath as mentioned above, which emits a fine spray of water which acts upon and treats the exhaust gases and steam mixture thereby cooling the mixture and causing the steam to condense. The act of condensation of the steam results in the capturing of the fine solid particles and water soluble particles which have been carried into the steam bath by the exhaust gases and in addition the water particles comprising the fine spray combine with the condensate readily due to the fact that water droplets readily combine with other water droplets to form larger water droplets which then fall by gravity together with the captured solid particles into the water reservoir.

The resulting action is one which efficiently removes the solid particle contaminants since it is based upon the fact that gases combine readily with each other and the water particles likewise combine readily with each other, and there is thus no need for combining dry particles directly into preformed droplets of water or water curtains as is necessary with prior water spray and water curtain smoke scrubbing devices.

The entire section of the device, including the combination of a burner chamber; the means for creating an extreme turbulence in the exhaust gases; the flue-like pipe 35 leading from the burner to the exhaust gas scrubber; the water reservoir 39 and heating means therefor; the sprayer 46; generally constitutes the scrubber section or chamber which removes the solid particles and soluble constituents from the exhaust gases as they pass therethrough.

Figure 4:
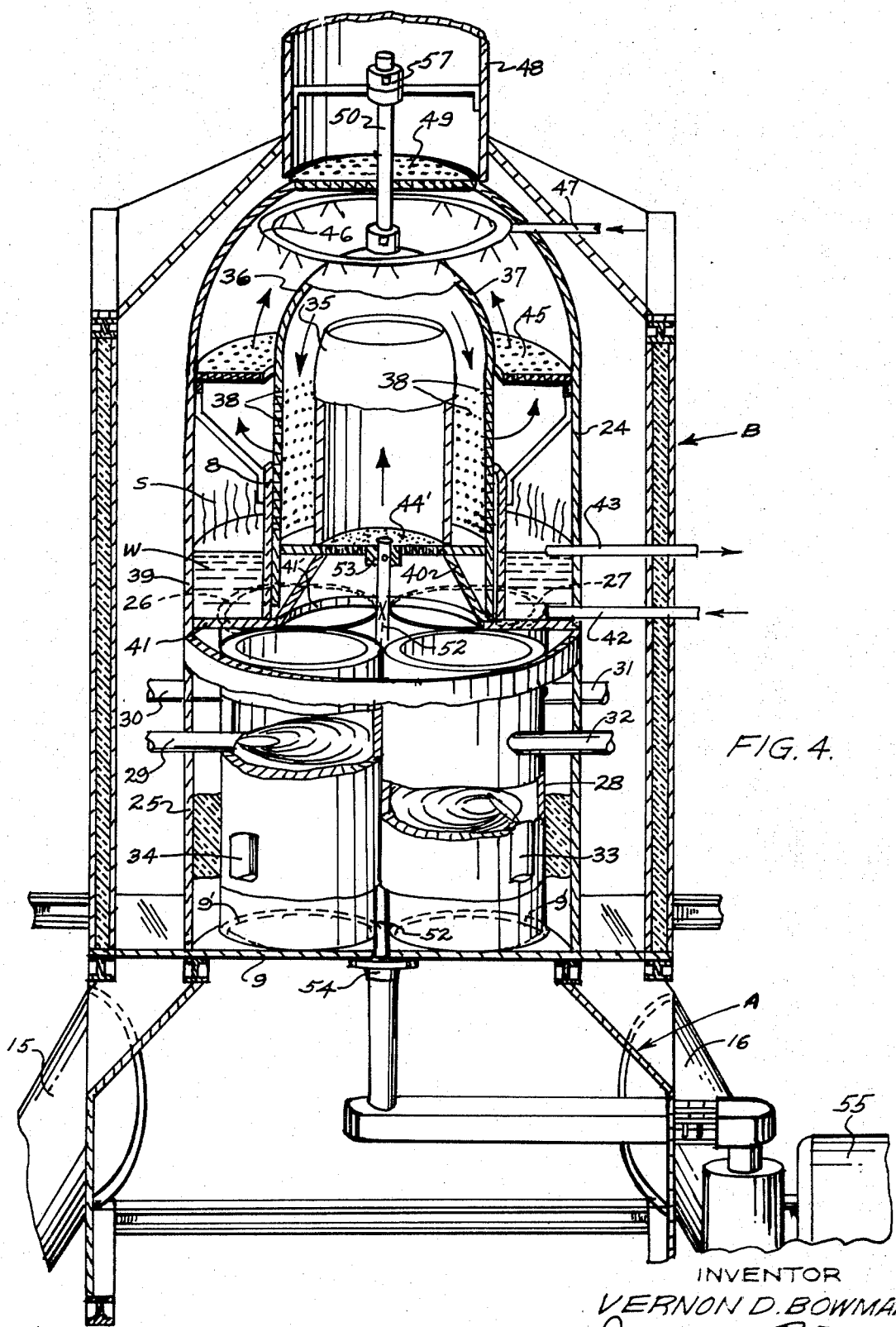
FIG. 4 is a longitudinal vertical sectional view similar to FIG. 3 of a slightly modified form.

The modified form shown in FIG. 4 is generally very similar to that of FIG. 3, in fact, most parts are identical and are designated by the same reference characters as in FIG. 3. In this form, however, the central flue-like pipe 35 and dome 37 are mounted within the casing so as to be rotatable as a unit therein on a vertical axis extending through the pipe 35. The rotatable mounting means for these parts consists of a shaft 50 attached centrally of the downwardly concaved dome top 37 which shaft extends upwardly and is supported in a bearing 57 mounted in the exhaust stack 48. A second shaft 52 is centrally attached at 53 to the element supporting the dome and axially aligned with shaft 50 and extending downwardly between the chambers 25–28 and is supported in bearing 54. A motor 55 and any conventional drive means is attached to the lower shaft 52 and serves as a means for rotating the same.

The modification of FIG. 4 operates much in the same manner as that shown in FIG. 3 except for the rotation of the central unit composed of the flue-like pipe 35 and the dome 37. This rotation assists in propelling the gases through the scrubber and at the same time break up any pattern flow of the solid particles as they are passed downwardly over the steam bath.

I claim:

1. An exhaust gas and smoke scrubber apparatus comprising:
   (a) an accumulation chamber for receiving the exhaust gases from at least one gas exhaust stack;
   (b) a burner chamber adjacent and in communication with the accumulation chamber for receiving the exhaust gases from the accumulation chamber;
   (c) at least one fuel burner in the burner chamber for elevating the exhaust gases to a high predetermined temperature for consuming combustible constituents in said exhaust gases as they pass through said burner chamber;
   (d) means for creating a high degree of turbulence of the exhaust gases as they pass through the burner chamber for subjecting all the area of the said exhaust gases passing therethrough to the maximum heat therein;
   (e) at least one conductor flue leading from the burner chamber to the scrubber chamber;
   (f) a downwardly concave gas deflector baffle in the form of a closed dome positioned upwardly from the exhaust end of the flue for deflecting the exhausting gases outwardly from the exhaust end of the said flue and angularly from the longitudinal axis thereof, the diameter of the baffle being such as to provide a space above the periphery of the baffle and the outer gas retaining casing of the scrubber apparatus, providing an escape passage for the scrubbed gases between the baffle and the casting;
   (g) a water reservoir positioned about the flue and means for heating the water therein, creating a steam bath area above the reservoir through which all exhaust gases pass;

(h) a fine water spray positioned upwardly above the water reservoir and the steam bath area and outside the gas deflective area of the dome for projection a fine water spray downwardly on the exhaust gases moving through the said steam bath toward the exhaust end of the scrubber apparatus for cooling and combining the fine spray of water particles with the steam and small solid particles to cause these to settle by gravity into the water reservoir;

(i) means to propel the exhaust gases through the accumulating chamber, burner, and scrubber chamber; and (j) at least said flue and baffle dome being rotatable and means for rotating the same.

2. The structure defined in claim 1 wherein the water spray is located above the steam generator and in the area between the outer gas retaining wall and concaved baffle dome.

3. The structure as defined in claim 1 wherein a perforated plate is located between the deflector dome and the steam bath area above the steam generator.

4. The structure as defined in claim 1 wherein a perforated baffle plate is positioned in the area between the concaved baffle dome and the outer gas retaining casing.

5. A scrubbing apparatus for exhaust gases comprising means defining a first chamber for receiving said exhaust gases therein, means for heating said exhaust gases to a high temperature including means for creating a high degree of turbulence while said gases are being heated for burning any combustible materials therein, means defining a water reservoir, means for heating said water reservoir including the water therein for creating a steam bath for said exhaust gases, means above said reservoir defining a steam chamber, means including a rotatably mounted flue and baffle dome for directing the exhaust gases from said first chamber to said steam chamber for mixing the same with steam from said reservoir, means for roating said flue and baffle dome a water spray means positioned to act upon said combined steam and exhaust gases to cause condensation of said steam and for mixing of the condensation with water from said spray for carrying away solid particles of matter from said exhaust gases concurrently with the cooling of said gases.

6. The apparatus of claim 5 in which said reservoir has a wall exposed to the hot exhaust gases in said first chamber and said exhaust gases and wall comprise said means for heating said reservoir.

7. The apparatus of claim 5 in which said water reservoir is annular in shape and in which said exhaust gases flow generally radially outwardly and rise upwardly to mix with the steam from the surface of the water therein and in which said water spray is superimposed above said steam chamber so that water and condensate fall by gravity back into said reservoir.

8. A scrubbing apparatus for cleansing exhaust gases of unburnable particles and other contaminates, comprising means heating said exhaust gases for removing combustible constituents therefrom, steady generating means positioned to emit steam gases for mixing with said heated exhaust gases, rotatably mounted flue and baffle dome means for transmitting the heated exhaust gases from said means for heating said exhaust gases into admixture with the steam produced by said steam generating means, means for rotating said flue and said baffle dome means, and water spray means positioned to act upon said mixture to effect condensation of said steam gases therefrom and for mixing of the condensate with the water from said spray for carrying away the solid particles of material from said exhaust gases together with the cooling of said gases.

9. The apparatus of claim 8 in which said steam generating means comprises a reservoir of boiling water positioned to receive the condensate and water from said spray, and means for removing the solid particles from said reservoir.

References Cited

UNITED STATES PATENTS

| | | | |
|---|---|---|---|
| 1,062,445 | 5/1913 | Ernst | 261—DIG. 9 |
| 1,078,927 | 11/1913 | Keltner | 261—126 X |

DENNIS E. TALBERT, JR., Primary Examiner

U.S. Cl. X.R.

23—2C; 55—222, 223, 230, 257—DIG. 20; 110—119; 261—117, 126, DIG. 9